(12) United States Patent
Park et al.

(10) Patent No.: US 10,412,574 B2
(45) Date of Patent: *Sep. 10, 2019

(54) METHOD AND APPARATUS FOR SELECTING PROFILE OF TERMINAL IN MOBILE NETWORK

(71) Applicant: Samsung Electronics Co., Ltd., Gyeonggi-do (KR)

(72) Inventors: Jonghan Park, Bucheon-si (KR); Sangjin Kim, Suwon-si (KR); Duckey Lee, Seoul (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/707,924

(22) Filed: Sep. 18, 2017

(65) Prior Publication Data

US 2018/0020342 A1 Jan. 18, 2018

Related U.S. Application Data

(63) Continuation of application No. 14/788,072, filed on Jun. 30, 2015, now Pat. No. 9,788,190.

(30) Foreign Application Priority Data

Jun. 30, 2014 (KR) ........................ 10-2014-0081234

(51) Int. Cl.
*H04W 12/06* (2009.01)
*H04W 8/18* (2009.01)
*H04L 29/06* (2006.01)
*H04W 8/20* (2009.01)

(52) U.S. Cl.
CPC .......... *H04W 8/183* (2013.01); *H04L 63/0853* (2013.01); *H04W 12/06* (2013.01); *H04W 8/205* (2013.01)

(58) Field of Classification Search
CPC ....................................... H04W 8/18
See application file for complete search history.

(56) References Cited

U.S. PATENT DOCUMENTS

| 9,204,300 B2* | 12/2015 | Park ...................... H04W 12/06 |
| 9,585,000 B2* | 2/2017 | Park ...................... H04W 8/18 |
| 2013/0023309 A1 | 1/2013 | Holtmanns et al. |
| 2013/0165073 A1 | 6/2013 | Madsen |
| 2013/0231087 A1 | 9/2013 | O'Leary |

(Continued)

OTHER PUBLICATIONS

Extended European Search Report dated Dec. 8, 2017, regarding Application No. 15815129.0, 8 pages.

*Primary Examiner* — Michael T Vu

(57) ABSTRACT

A method and apparatus of selecting profiles is provided that provides communication services of a terminal equipped with embedded Universal Integrated Circuit Card (eUICC) (or embedded Subscriber Identity Module (eSIM)) and Universal Integrated Circuit Card (UICC). The method of selecting a profile in a terminal including a plurality of subscriber identity module (SIMs) that differ from each other in type, includes selecting, when sensing a profile changing event, one of the plurality of SIMs according to a preset rule, selecting one of a plurality of profiles stored in the plurality of SIMs, and applying the selected profile to the terminal.

14 Claims, 12 Drawing Sheets

(56) References Cited

U.S. PATENT DOCUMENTS

2013/0344864 A1   12/2013  Park et al.
2014/0088731 A1    3/2014  Von Hauck
2015/0180847 A1*  6/2015  Nix ...................... H04L 9/0869
                                                         713/168

* cited by examiner

METHOD AND APPARATUS FOR SELECTING PROFILE OF TERMINAL IN MOBILE NETWORK

CROSS-REFERENCE TO RELATED APPLICATION AND CLAIM OF PRIORITY

The present application is a continuation of U.S. patent application Ser. No. 14/788,072 filed Jun. 30, 2015, which is related to and claims the benefit under 35 U.S.C. § 119(a) of a Korean patent application filed on Jun. 30, 2014 in the Korean Intellectual Property Office and assigned Serial No. 10-2014-0081234, the entire disclosure of which is hereby incorporated by reference.

TECHNICAL FIELD

The present invention relates to a method and apparatus for selecting a profile of a terminal. More particularly, the present invention relates to a method and apparatus of selecting profiles that provides communication services of a terminal equipped with embedded Universal Integrated Circuit Card (eUICC) (or embedded Subscriber Identity Module (eSIM)) and Universal Integrated Circuit Card (UICC).

BACKGROUND

In order for a terminal to connect to a mobile communication network, mutual authentication is required between the terminal and the mobile communication network. Through mutual authentication, the mobile communication service provider identifies whether terminals are legitimate subscribers and provides the legitimate terminals with services, and the terminal also connects to the mobile communication network with security and makes voice chat and data communication. In mutual authentication, a subscriber identifier and an encryption key are used. Terminals store subscriber identifiers and encryption keys in the Universal Integrated Circuit Card (UICC) physically separated from them. When mutual authentication is made between an authentication server of a mobile communication network and a UICC of a terminal, the terminal relays authentication messages between the server and the UICC. A UICC is used to identify a subscriber and contains information about communication service providing companies in the process of manufacture. When users have a plan to change an existing mobile communication network of one communication service providing company through which they have received communication services to a mobile communication network of another communication service providing company while keeping their same terminals, they need to use an additional UICC compatible to the other communication service providing company supporting the new mobile communication network.

SUMMARY

In order for terminals to employ eUICC and UICC together, the terminals need a system for efficiently select one of a plurality of profiles stored in the eUICC and UICC.

To address the above-discussed deficiencies, it is a primary object to provide a method and apparatus that efficiently selects one of the profiles stored in eUICC and UICC and allows a terminal with both eUICC and UICC to connect to a network.

In accordance with an embodiment of the present invention, the present invention provides a method of selecting a profile in a terminal including a plurality of subscriber identity module (SIMs) that differ from each other in type, including: selecting, when sensing a profile changing event, one of the plurality of SIMs according to a preset rule; selecting one of a plurality of profiles stored in the plurality of SIMs; and applying the selected profile to the terminal.

In accordance with another embodiment of the present invention, the present invention provides an apparatus for selecting a profile including: a profile storing unit including a plurality of subscriber identity module (SIMs) that differ from each other in type; and a controller for: selecting, when sensing a profile changing event, one of the plurality of SIMs according to a preset rule; selecting one of a plurality of profiles stored in the plurality of SIMs; and performing a controlling to apply the selected profile to the terminal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
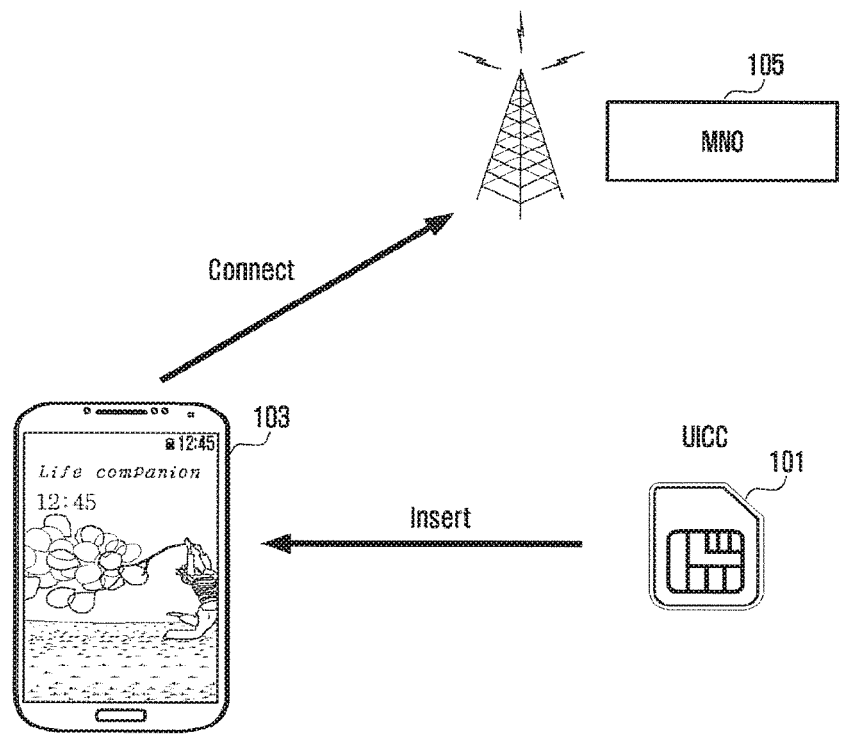
FIG. 1 is a diagram illustrating an example method of making communication using a Universal Integrated Circuit Card (UICC) according to this disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device and communication system.

The present disclosure relates to a method that allows a terminal equipped with both eUICC and UICC to select a profile in order to make a communication with a network. More specifically, the present disclosure provides a method that allows a terminal with both embedded Universal Integrated Circuit Card (eUICC) and Universal Integrated Circuit Card (UICC) to efficiently select, when connecting to a mobile communication network by using operational profiles, a profile stored in the eUICC or a profile stored in the UICC and to connect to the network. The present disclosure describes terminals with eUICC and UICC. The present disclosure also applies to all types of devices and services supporting eUICC and UICC as well as electronic devices such as smartphones, portable terminals, mobile terminals, Personal Digital Assistants (PDAs), Portable Multimedia Players (PMPs), laptops, Wibro terminals, smart TVs, smart refrigerators, and the like.

It should be understood that the present disclosure is not limited to the devices listed herein. The present disclosure can also be applied to terminals with only a eUICC. Hereinafter, embodiments of the present disclosure are described in detail with reference to the accompanying drawings. The same reference numbers are used throughout the drawings to refer to the same or similar parts. Detailed descriptions of well-known functions and structures incorporated herein may be omitted to avoid obscuring the subject matter of the invention.

In order for a terminal to connect to a mobile communication network, mutual authentication is required between the terminal and the mobile communication network. Through mutual authentication, the mobile communication service provider identifies whether terminals are legitimate subscribers and provides the legitimate terminals with services, and the terminal also connects to the mobile communication network with security and makes voice chat and data communication. In mutual authentication, a subscriber identifier and an encryption key are used. Terminals store subscriber identifiers and encryption keys in the Universal Integrated Circuit Card (UICC) physically separated from them. When mutual authentication is made between an authentication server of a mobile communication network and a UICC of a terminal, the terminal relays authentication messages between the server and the UICC. A UICC is used to identify a subscriber and contains information about communication service providing companies in the process of manufacture. When users have a plan to change an existing mobile communication network of one communication service providing company through which they have received communication services to a mobile communication network of another communication service providing company while keeping their same terminals, they need to use an additional UICC compatible to the other communication service providing company supporting the new mobile communication network.

An embedded Universal Integrated Circuit Card (eUICC) or embedded Subscriber Identity Module (eSIM) may be a UICC installed to mobile communication terminals in the process of manufacturing the terminals. According to various embodiments of the present invention, the eUICC can be detachable and/or replaceable. A eUICC may be referred to as a UICC to which subscriber identifiers and encryption keys downloaded from remote servers according to communication companies can be installed. When users have a plan to subscribe a new communication service providing company, their terminals download the subscriber identifiers and encryption keys of the company from the remote server to the eUICC without the installation of a new UICC. In that case, a variety of information for services provided by a corresponding mobile communication service providing company, including a subscriber identifier and encryption key, is called a profile. That is, when a profile is remotely installed to eUICC, a subscriber identifier and encryption key are also installed to the eUICC along with information contained in the profile.

If a subscriber identifier and encryption key of a terminal are revealed during the remote installation of a profile, it causes a threat to the security of data communication and voice chat of the terminal. To prevent this, the remote transmission of profiles requires strict encryption. To this end, a remote server and eUICC need to have shared profile management encryption keys set to the respective eUICC before performing transmission, and thus encryption is performed by corresponding encryption keys in remote transmission session.

In order to remotely install a subscriber identifier and encryption key to a eUICC, a mobile communication terminal with a eUICC needs to have been in a communication provisioning state. To this end, a subscriber identifier and encryption key (or a provisioning profile), only used for remote installation of a temporary profile to enable a terminal to be in a communication provisioning state, have previously been installed to the eUICC. In that case, the subscriber identifier and encryption key, available as a provisioning profile installed in the eUICC, need to be stored in a mobile communication service providing company so that the communication company considers the terminal a legitimate subscriber. Therefore, the cost of communication services for installation of a provisioning profile to eUICC is contained in the cost of a terminal. However, the communication service is restricted to a process for installing a profile, and thus the communication service cost is relatively lower than the cost for general communication services.

FIG. 1 is a diagram illustrating an example method of making communication by using a Universal Integrated Circuit Card (UICC) according to this disclosure. Referring to FIG. 1, a UICC 101 is inserted into a terminal 103. The terminal 103 connects to Mobile Network Operator (MNO) 105 by using information about connectable MNOs, stored in the UICC. When the UICC is installed to the terminal, the terminal may be connected to a network managed by the MNO.

Figure 2:
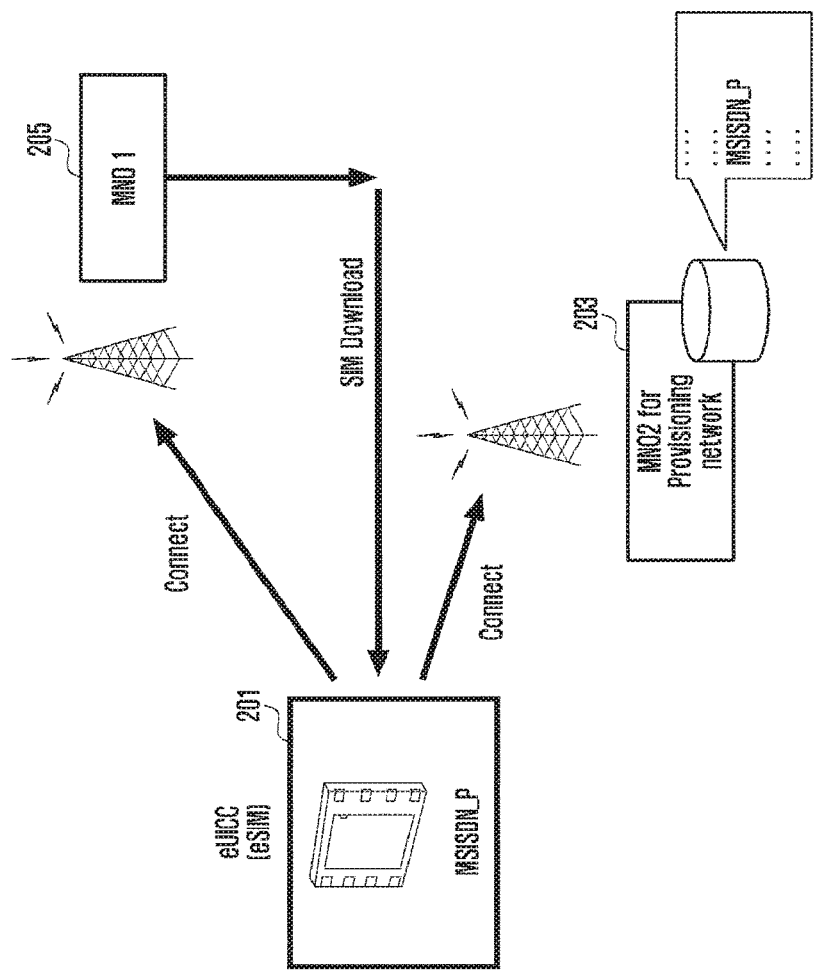
FIG. 2 is a diagram illustrating an example method of making communication using an embedded Universal Integrated Circuit Card (eUICC) according to this disclosure.

FIG. 2 is a diagram illustrating an example method of making communication using an embedded Universal Integrated Circuit Card (eUICC) according to this disclosure. Referring to FIG. 2, a provisioning profile is stored in a eUICC 201. The eUICC 201 connects to a provisioning network 203 by using the provisioning profile. The provisioning profile contains information used to connect to a Mobile Network Operator (MNO), such as an international mobile subscriber identity (IMSI) and a Ki. A provisioning profile may also be called a bootstrap profile. In general, a provisioning profile or bootstrap profile is installed to eUICC in the process of manufacture of the eUICC and is used to provide a network access environment allowing for remote download of other profiles.

Meanwhile, there are profiles used to access general networks without any use restriction compared with the provisioning profile, and these profiles are called operational profiles. As shown in FIG. 2, the eUICC 201 downloads operational files from MNO 1, indicated by reference number 205, over the provisioning network 203. The terminal connects to the MNO 1 by using the downloaded operational profiles.

As described above, the system of using eUICC makes service providers reduce the cost of purchasing USIM cards and the distribution cost, compared with the method of existing UICCs. Therefore, the system of using eUICC leads to new business models in the fields of connected car, M2M, tablet, and the like.

In order to introduce eUICC, infrastructures remotely to install servers need to be established. MNOs need to have arranged their infrastructures in order to process their information alteration, etc. without restriction. Therefore, it will take a relatively long time until eUICC has been introduced to most MNOs, and until then, terminals employing eUICC and UICC together will be used.

Figure 3:
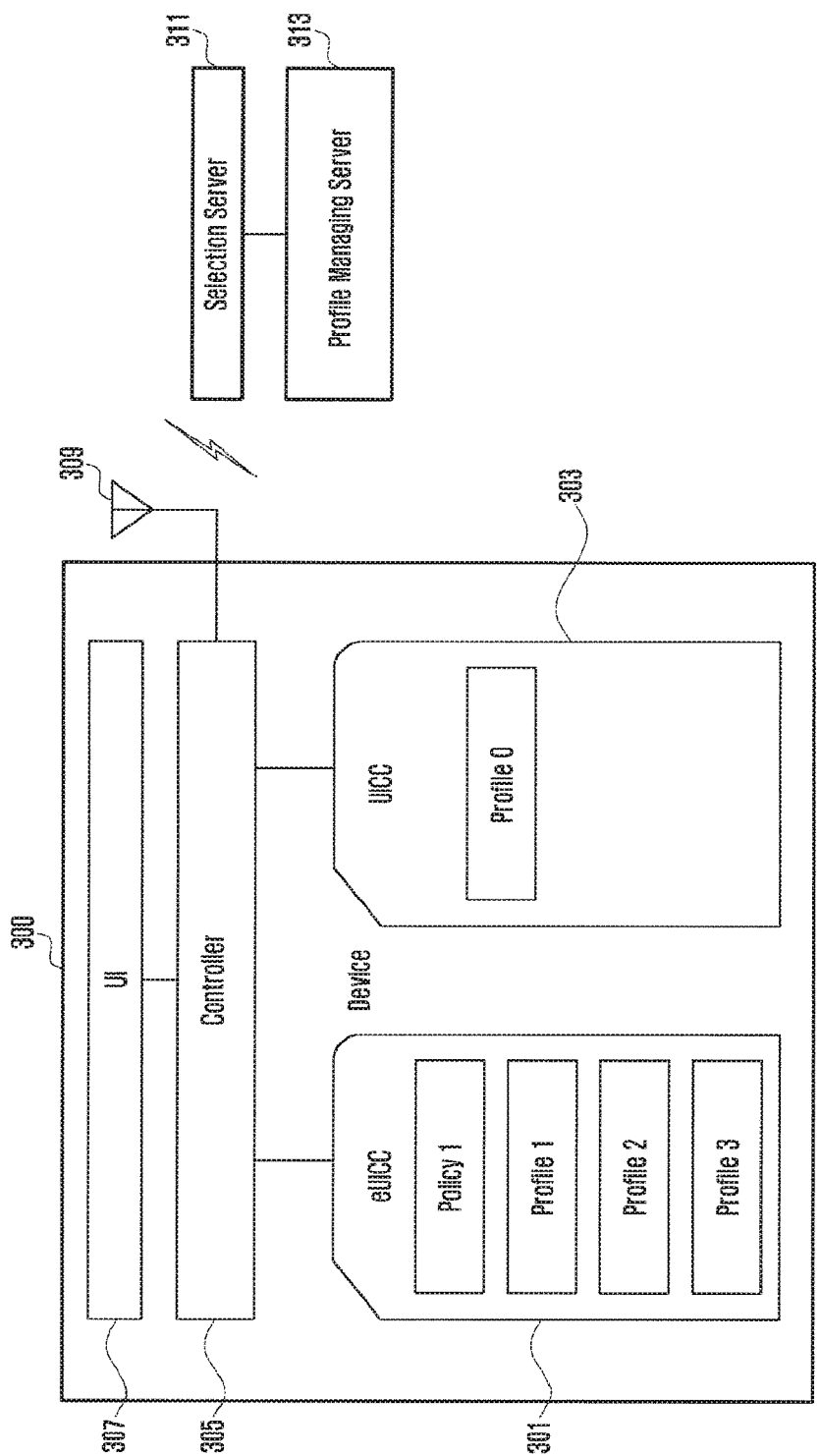
FIG. 3 is a schematic block diagram of an example terminal according to this disclosure.

FIG. 3 is a schematic block diagram illustrating an example terminal according to this disclosure. Referring to FIG. 3, the terminal 300 includes at least one of the following: eUICC 301 and UICC 303. The eUICC 301 stores policy and at least one profile. The UICC 303 stores a single profile. In the following description, the eUICC 301 may be called a storage unit, a profile storing unit, a terminal embedded profile storing unit, and the like. Similarly, the UICC 303 may be called a storage unit, a profile storing unit, an external or detachable profile storing unit, and the like.

In various embodiments of the present disclosure, the controller 305 performs control operations to select one of a plurality of profiles stored in the eUICC 301 and UICC 303 in order to connect a mobile communication network. The controller 305 selects one of the eUICC 301 and UICC 303 to be used in connecting to a mobile communication network or selects one of a plurality of profiles stored in the UICC 301 to be used in connecting to a mobile communication network. The controller 305 also controls other components in the terminal 300 to perform operations according to the present disclosure, which is explained herein.

In various embodiments of the present disclosure, the controller 305 selects profiles based on a user's inputs. To this end, the terminal 300 includes a user interface (UI) 307. The UI 307 includes an input unit for receiving a user's inputs. The input unit receives a user's operated signals. The input unit is implemented with a key pad, a dome switch, a touch pad (of resistive/capacitive type), a jog wheel, a jog switch, or the like. The UI 307 includes a display for displaying information required to select profiles. The display is implemented with a Liquid Crystal Display (LCD), a Thin Film Transistor-liquid crystal display (TFT LCD), Organic Light Emitting Diodes (OLEDs), a flexible display, a three-dimensional (3D) display, or the like. In various embodiments, the input unit and the display are configured in a layered structure, such as a touch screen with touch sensors or proximity sensors.

The terminal 300 according to the present disclosure includes a communication unit 309 for performing data communication with external systems. The communication unit 309 includes a transmitter for up-converting the frequency of signals to be transmitted and amplifying the signals and a receiver for low-noise amplifying received RF signals and down-converting the frequency of the received RF signals.

The terminal 300 communicates with an external selection server 311 through the communication unit 309. The selection server 311 cooperates with a profile managing server 313. The profile managing server 313 can also be called a Profile Manager or a Subscription Manager-Subscription Profile (SM-SR). The selection server 311 communicates with the controller 305 of the terminal 300 and supports the selection of a profile. The profile managing server 313 remotely installs profiles in the terminal 300.

Figure 4:
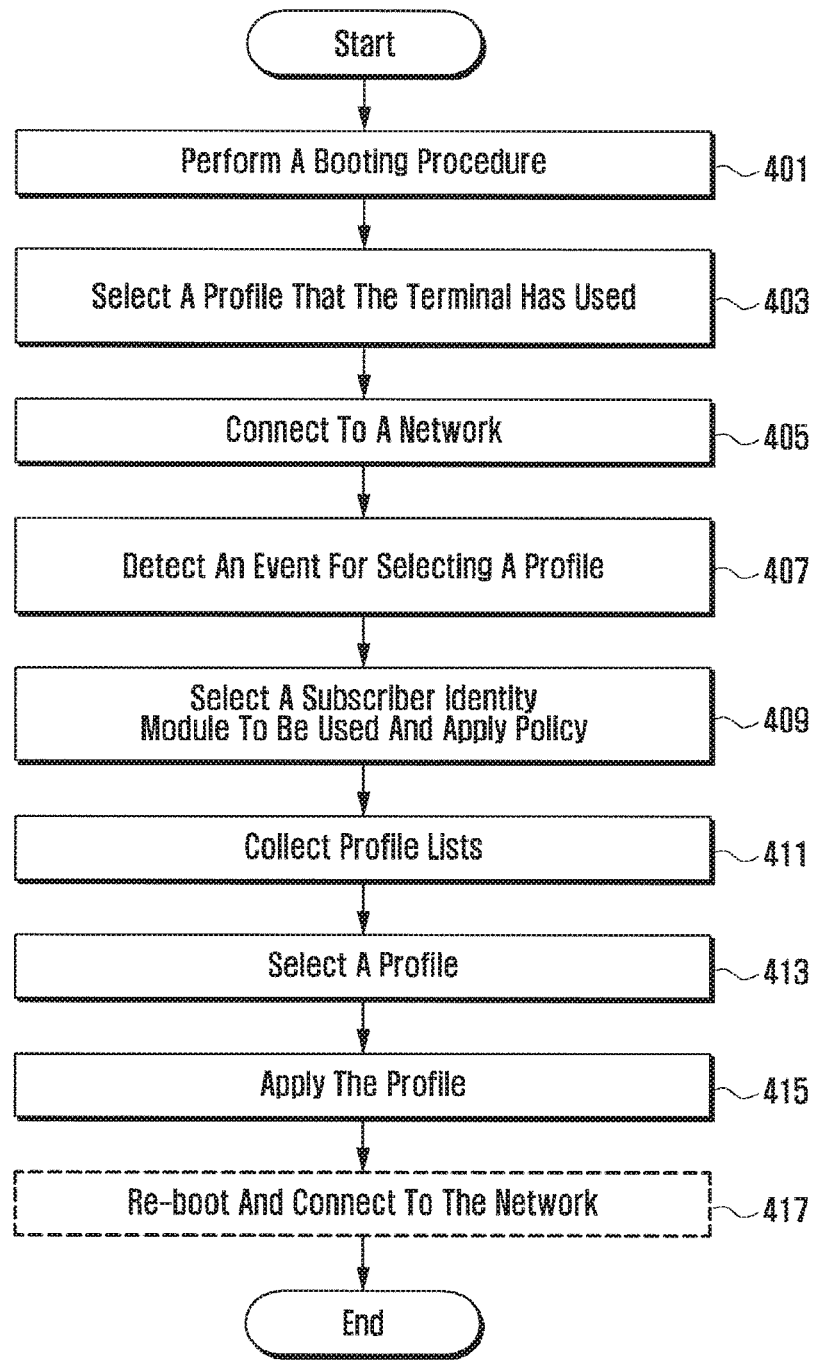
FIG. 4 is a flow chart illustrating an example method of selecting a profile of a terminal according to this disclosure.

FIG. 4 is a flow chart illustrating an example method of selecting a profile of a terminal according to this disclosure. The terminal includes eUICC and UICC as subscriber identity module (SIM). Referring to FIG. 4, when the terminal is turned on, it performs a booting procedure (401). The terminal checks and selects a profile that it has used (called a previously used profile) (403). The terminal selects a profile that it has used to connect to a mobile communication network. The profile that the terminal has used can be an operational profile.

The terminal connects to a network by using the selected profile that it has used (405). When the terminal senses an event for selecting a profile (407), it selects a subscriber identity module to be used (409). The profile selecting event is a trigger event for starting the selection of a profile. The profile selecting event occurs in a manual mode according to a user's command or in an automatic mode as a preset condition is satisfied. A mode for sensing the profile selecting event, including a manual mode or an automatic mode, is automatically set according to a user's input or a preset condition. When the terminal senses a user's input for setting a profile selecting event sensing mode, it sets a current mode to a profile selecting event sensing mode. The terminal displays UI related to the settings of a profile selecting event sensing mode and receives a user's inputs through the UI.

When the profile selecting event sensing mode is set to a manual mode, a profile selecting event occurs according to a user's input for requesting for changing a profile. That is, when the profile selecting event sensing mode is set to a manual mode, the terminal does not automatically change a profile although the wireless link quality or the network state varies. When the terminal senses a user's input for changing a profile, it ascertains that a profile selecting event has been sensed. The terminal displays UI for selecting profiles and receives a user's input for changing a profile through the UI. The UI for changing profile is configured with a menu for selecting profiles on the terminal setting screen. In an embodiment, the UI for changing profiles is configured with at least one profile selectable. In that case, the UI for changing profiles corresponds to a profile list UI which will be described later.

When the profile selecting event sensing mode is set to an automatic mode, a profile selecting event occurs when satisfying at least one of the following conditions. Condition 1: a profile selecting event occurs when Mobile Network Operator (MNO) is changed according to the movement of terminal or a user's selection. The change in MNO is sensed according to a change in Public Land Mobile Network Identity (PLMN ID), and the like. Therefore, a profile selecting event occurs when the PLMN ID of a terminal is changed.

Condition 2: a profile selecting event occurs according to a change in network state (a change in channel state). When the signal quality of a wireless section between a terminal and a base station is changed, the terminal ascertains that a profile selecting event has occurred. For example, when the signal strength of network is out of a preset range or is equal to or less than a preset threshold or when noise strength and/or noise ratio is out of a preset range or is equal to or greater than a preset threshold, the terminal ascertains that a profile selecting event has occurred. The preset range and the preset threshold is set to arbitrary values respectively. In the embodiment, the signal quality of a wireless section is measured based on RSRP, RSSI, etc. The terminal periodically measures RSRP or RSSI, and senses a profile selecting event, based on the measured RSRP or RSSI.

In various embodiments of the invention, when the terminal senses a state where the network has been changed for a preset period of time or more than a preset number of times, it ascertains that a profile selecting event has occurred.

Condition 3: a profile selecting event occurs as a preset period of time has elapsed. For example, when the terminal ascertains that a preset period of time has elapsed from a time point that: the terminal is booted, the terminal is initially opened to communication, the terminal is initially connected to a network, the terminal connects to a network by using a provisioning profile, or the like, it ascertains that a profile selecting event has occurred. When following the embodiments described above, MNO guides terminal users to start with the selection of a particular profile after a preset period of time has elapsed according to the policy.

Condition 4: a profile changing event occurs according to an instruction for changing a profile from a network according to a change in network state. When a network (which may also be called a base station, eNB, or the like.) cannot make communication due to the network overload or the breakdown of network equipment, it makes a command (instruction, request) for the terminal to change a profile. When the terminal receives a command for changing a profile from the network, it ascertains that a profile changing event has occurred. The network transmits a profile changing command according to a change in network state to the terminal through a signaling. When the terminal has changed a profile by sensing the profile changing event, it transmits the profile change response to the network. The profile changing command according to a change in network state or the profile change response is transmitted through a message defined as upper signaling or a message defined as other methods.

Condition 5: a profile changing event occurs according to a change in MNO's policy. When the terminal receives a command for changing a profile according to a change in MNO's policy from a network, it ascertains that a profile changing event has occurred. When the terminal has changed a profile by sensing the profile changing event, it transmits the profile change response to the network. The profile changing command according to a change in MNO's policy or the profile change response is transmitted through a message defined as upper signaling or a message defined as other methods.

Referring back to FIG. 4, when the terminal senses a profile changing event, it selects a subscriber identity module (SIM) (409). The terminal selects a subscriber identity module (SIM) by applying a MNO's policy or policy rule. That is, the terminal select one of the eUICC and UICC as a SIM according to a preset policy.

The terminal selects one of the eUICC and UICC as a SIM according to at least one of the following conditions. That is, a MNO's policy is established so that a terminal can select a SIM according to at least one of the following conditions.

Condition 1: a terminal selects a SIM according to a user's input. When a terminal senses a user's input for selecting a SIM, it selects the SIM corresponding to the user's input. The terminal displays UI for selecting a SIM and receives a user's input for selecting a SIM through the UI. The UI for setting profiles is configured to include menus for selecting one of the eUICC and UICC to be used as a SIM. Condition 2: a terminal assigns a high priority to eUICC and selects the eUICC as a SIM. When a terminal ascertains that eUICC exists and a profile connectable is included in the eUICC, it selects the eUICC with high priority. Condition 3: a terminal assigns a high priority to UICC and selects the UICC as a SIM. When a terminal ascertains that UICC exists and a profile connectable is included in the UICC, it selects the UICC with high priority.

Condition 4: a terminal selects a SIM according to whether a preset period of time has elapsed. A terminal selects eUICC or UICC as a SIM according to whether a preset period of time has elapsed. For example, the terminal is set in such a way that it selects UICC with high priority until a preset period of time has elapsed from a time point that: the terminal is initially opened to communication, the terminal is initially connected to a network, the terminal connects to a network by using a provisioning profile, etc. and then selects eUICC. The terminal is also set in such a way that it selects eUICC with high priority until a preset period of time has elapsed from a time point that: the terminal is initially opened to communication, the terminal is initially connected to a network, the terminal connects to a network by using a provisioning profile, or the like, and then selects UICC.

Condition 5: a terminal selects a SIM based on the location where the terminal is located. For example, a terminal selects a SIM based on the PLMN ID. When the current location of the terminal, i.e., the location corresponding to the PLMN ID of the terminal, is within a PLMN area corresponding to a profile stored in the eUICC, the terminal selects eUICC as a SIM, with high priority. However, when the current location the terminal is not within a PLMN area corresponding to a profile stored in the eUICC, the terminal selects UICC as a SIM, with high priority. Condition 6: a terminal selects a SIM according to whether to connect to a network by using stored profiles. When a terminal cannot connect to a network by using profiles stored in eUICC, it selects UICC as a SIM. When a terminal cannot connect to a network by using profiles stored in UICC, it selects eUICC as a SIM. Condition 7: with assigning the highest priority to UICC for a case that a terminal does not obtain a provisioning profile from eUICC, the terminal selects, when not obtaining a provisioning profile from eUICC, the UICC as a SIM.

Figure 5:
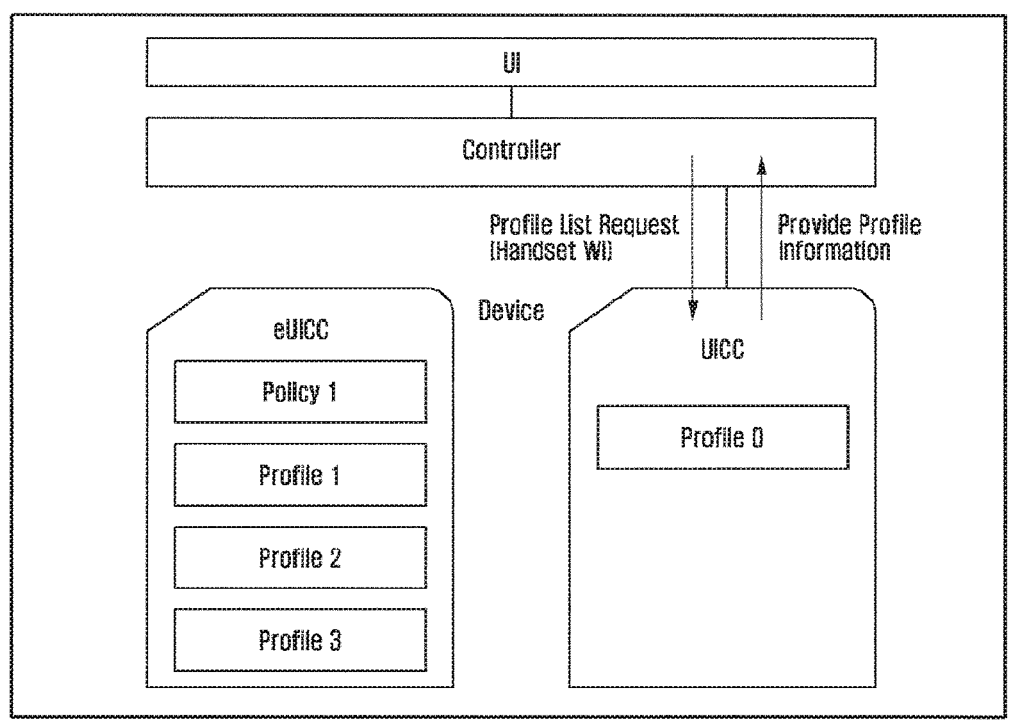
FIG. 5 is a diagram illustrating an example method of collecting profile lists by a terminal according to this disclosure.

Referring back to FIG. 4, the terminal collects profile lists (411). The terminal obtains profile lists stored in the eUICC or UICC determined according to the policy. In various embodiments, the terminal directly obtains a profile list stored in UICC from the UICC. In various embodiments, the terminal obtains a profile list stored in eUICC from the eUICC or obtains a profile list stored in eUICC from an external server outside the terminal. FIG. 5 is a diagram that describes a method of collecting profile lists by a terminal according to a first embodiment of the present invention. FIG. 5 shows a diagram that describes a method for a terminal to directly collect profile information stored in UICC from the UICC. Referring to FIG. 5, the controller transfers a message for requesting profile information to UICC and receives the profile information from the UICC. The profile information includes at least one of the following: an ID of a profile stored in the UICC, information about MNO contained in a profile, and MSISDN contained in a profile. A profile ID is an identifier for identifying a profile, e.g., ICCID.

Figure 6:
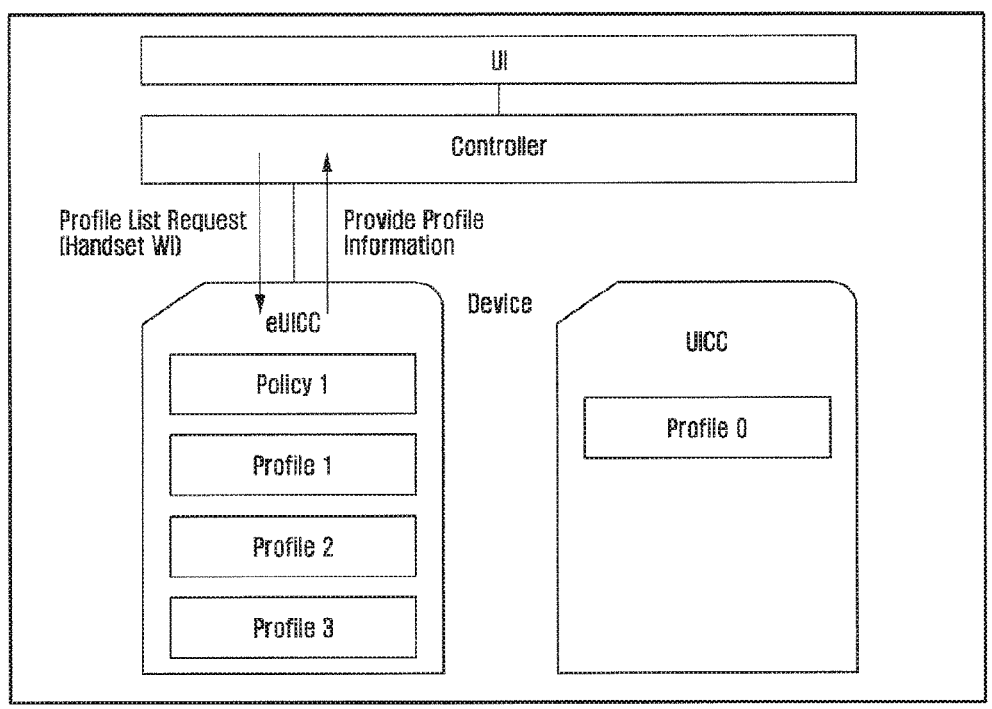
FIG. 6 is a diagram illustrating an example method of collecting profile lists by a terminal according to this disclosure.

FIG. 6 is a diagram illustrating an method of collecting profile lists by a terminal according to this disclosure. FIG. 6 shows a diagram that describes a method for a terminal to directly collect profile lists stored in eUICC from the eUICC. Referring to FIG. 6, the controller obtains profile lists through direct information exchange with the eUICC. The controller transfers a message for requesting a profile list to the eUICC and receives a profile list containing information about at least one profile from the eUICC. During this process, the controller and eUICC uses a first authorization credential. That is, only when the eUICC receives a request with a proper authorization credential from the controller, it transfers a profile list to the controller. The first authorization credential is configured with one of the following: an authentication, a corresponding private key, a symmetric key, ID and password. The profile list includes at least one of the following: profile IDs of respective profiles stored in the eUICC, information about MNOs contained in respective profiles, and MSISDN contained in respective profiles. A profile ID is an identifier for identifying a profile, e.g., ICCID.

Figure 7:
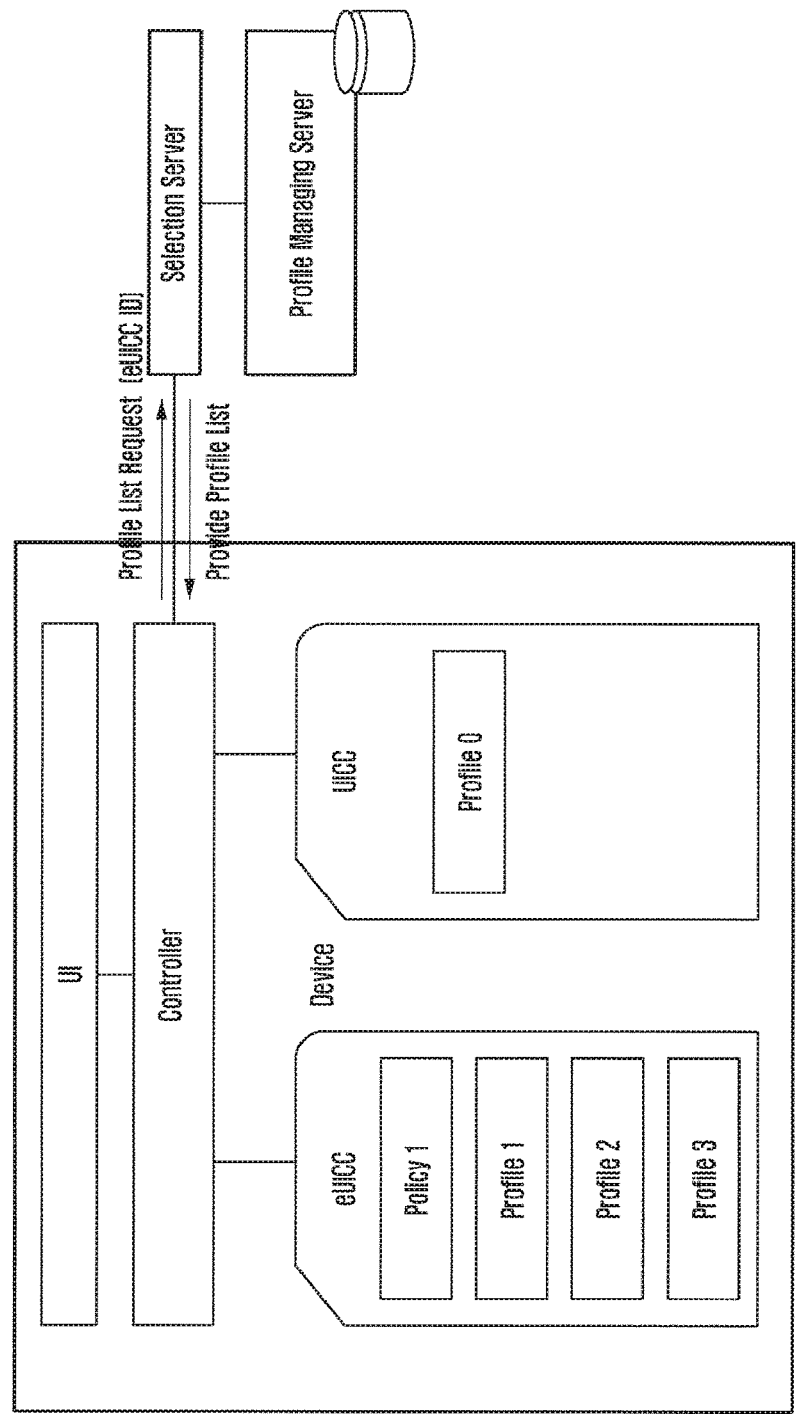
FIG. 7 is a diagram illustrating an example method of collecting profile lists by a terminal according to this disclosure.

FIG. 7 is a diagram illustrating an example method of collecting profile lists by a terminal according to a third embodiment of the present invention. FIG. 7 shows a diagram that describes a method for a terminal to collect profile lists by exchanging information with an external server. Referring to FIG. 7, the controller transfers a message for requesting a profile list containing eUICC ID to an external server (e.g., selection server) outside the terminal. After receiving the message of requesting a profile list, the server obtains a profile list corresponding to the eUICC ID from a profile managing server and transmits the obtained profile list to the controller. During this process, the controller and the server uses a second authorization credential. That is, when the server receives the profile list requesting message from the controller, it authenticates the controller by using the second authorization credential. When the authentication is successful, the server transmits a profile list to the controller. The second authorization credential is identical to or different from the first authorization credential. The second authorization credential is configured with one of the following: an authentication, a corresponding private key, a symmetric key, ID and password. The profile list includes at least one of the following: profile IDs of respective profiles stored in the eUICC, information about MNOs contained in respective profiles, and MSISDN contained in respective profiles. A profile ID is an identifier for identifying a profile, e.g., ICCID.

Referring back to FIG. 4, the terminal selects a profile from the collected profile list (413). The terminal determines (selects) a profile to be used, from among the profiles in the selected SIM. The terminal selects a profile according to a user's input (manual mode) or a preset condition (automatic mode).

In manual mode, the terminal displays a UI related to at least one profile on the display and receives a user's input for selecting a profile through the UI. The terminal selects a profile corresponding to the user's input. The UI is configured to include at least one of the following: MNO name, MVNO name, and MSISDN, as information related to at least one profile. The UI related to at least one profile is non-aggregated profile UI or aggregated profile UI.

Figure 8:
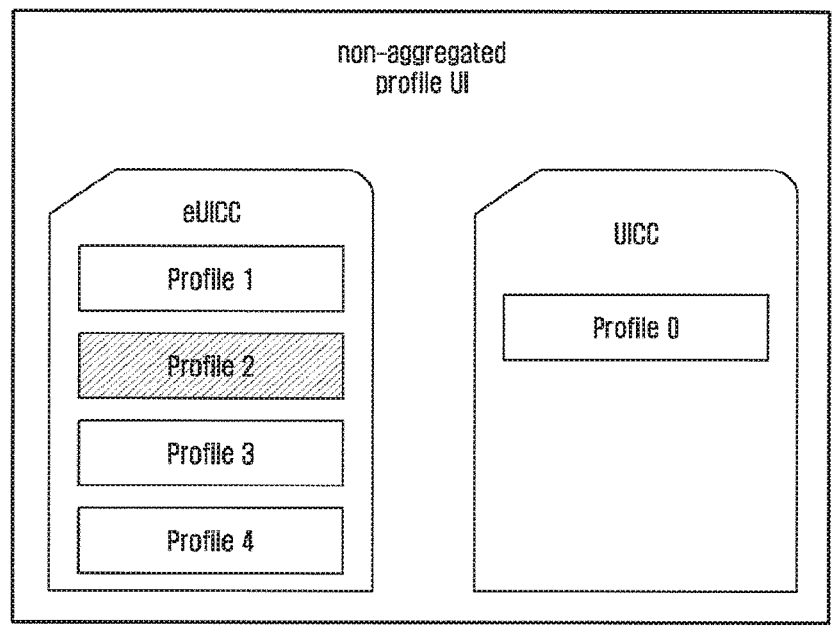
FIG. 8 is a diagram illustrating an example non-aggregated profile UI according to this disclosure.
Figure 9:
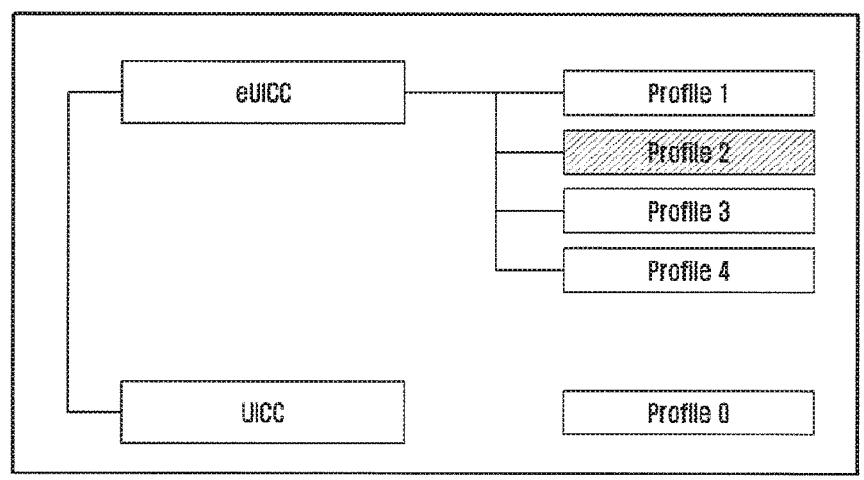
FIG. 9 is a diagram illustrating an example non-aggregated profile UI according to this disclosure.

FIG. 8 is a diagram of a non-aggregated profile UI according to an embodiment. Referring to FIG. 8, the non-aggregated profile UI displays one or more profiles stored in eUICC and UICC, classifying the profiles. FIG. 9 is a diagram of a non-aggregated profile UI according to another embodiment. The non-aggregated profile UI is not limited to the forms shown in FIGS. 8 and 9. It should be understood that the non-aggregated profile UI is formed in various forms in order to classify and display one or more profiles stored in eUICC and UICC.

Figure 10:
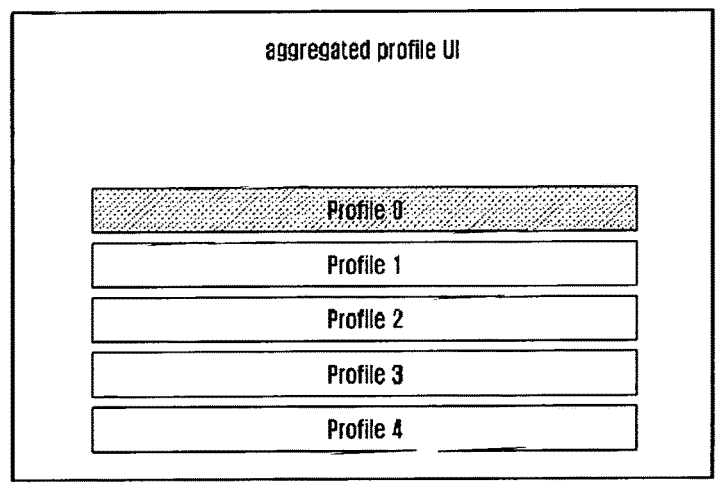
FIG. 10 is a diagram illustrating an example aggregated profile UI according to this disclosure.

FIG. 10 is a diagram of an aggregated profile UI according to an embodiment. Referring to FIG. 10, the aggregated profile UI displays one or more profiles stored in eUICC and UICC, with integrating the profiles, or without classifying the profiles. When displaying UI, as shown in FIGS. 8 to 10, the terminal displays the currently selected profile by highlighting it with an effect, such as shading, changing in font, coloring, etc. As shown in FIGS. 8 to 10, when the terminal senses an input applied to one of the profiles displayed on the UI, it selects the profile corresponding to the input. In automatic mode, the terminal selects a profile according to one of the following criteria.

Criterion 1, a terminal selects a profile according to a network state (channel state). When the signal quality of a wireless section between a terminal and a base station is best, the terminal selects a profile corresponding to the mobile communication network. The signal quality of a wireless section is measured based on RSRP, RSSI, etc. That is, the terminal measures RSRP or RSSI, and selects a profile corresponding to a network of which the state is best, based on the measured RSRP or RSSI. Criterion 2, a terminal selects a particular profile previously set according to MNO's policy. A terminal selects a particular profile that has previously been set to be selected when a profile changing event occurs according to MNO's policy. Criterion 3, a terminal selects a profile based on the terminal location. For example, a terminal selects a profile based on the terminal's PLMN ID. The terminal selects a profile corresponding to a mobile communication network to which the current location of the terminal, such as the location corresponding to the PLMN ID of the terminal, is related. Criterion 4, a terminal selects a profile based on time points that profiles are stored. For example, a terminal selects a profile that has been initially or most recently stored in eUICC or UICC. In an embodiment, when a preset period of time has elapsed from a time point that a profile is stored, the terminal may not select a corresponding profile.

In an embodiment, when the terminal selects UICC as a SIM, only one profile is stored in the UICC. Therefore, the process of selecting a profile, described above, is omitted.

In an embodiment, when the terminal selects eUICC as a SIM, information about profiles stored in UICC may not be displayed on UI displayed in manual mode. Similarly, when the terminal selects UICC as a SIM, information about profiles stored in eUICC may not be displayed on UI displayed in manual mode. In that case, UI displayed on the display of the terminal is non-aggregated profile UI. Referring back to FIG. 4, when a profile is selected, the selected profile is applied to the terminal (415).

Figure 11:
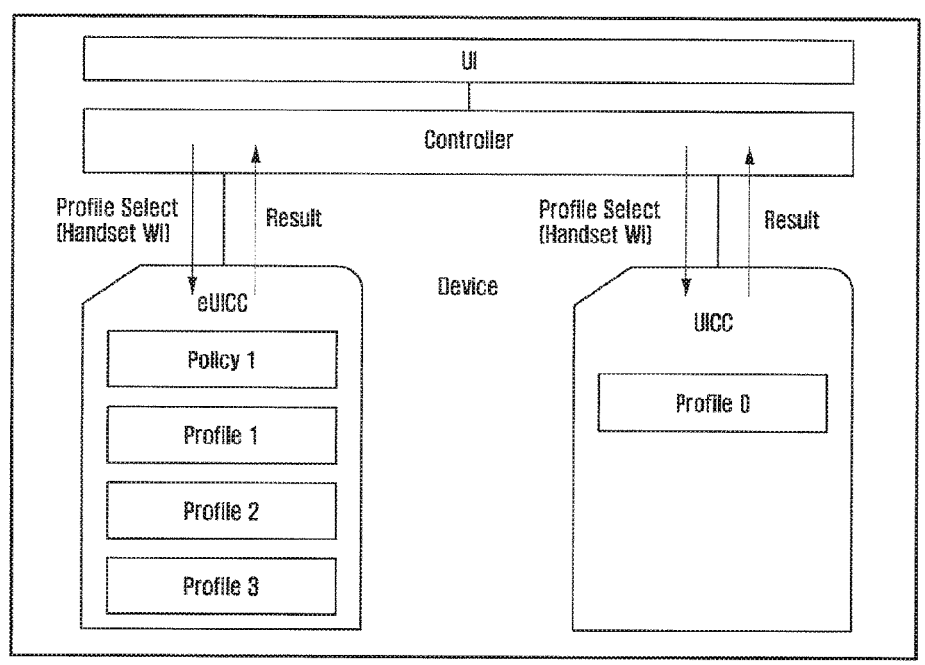
FIG. 11 is a diagram illustrating an example method for a controller to directly select a profile and to apply the selected profile to eUICC or UICC according to this disclosure.

As shown in FIG. 11, the terminal directly controls eUICC or UICC and applies the profile. The controller requests eUICC or UICC to apply the selected profile to the eUICC or UICC, and receives the response with the application result from the eUICC or UICC.

Figure 12:
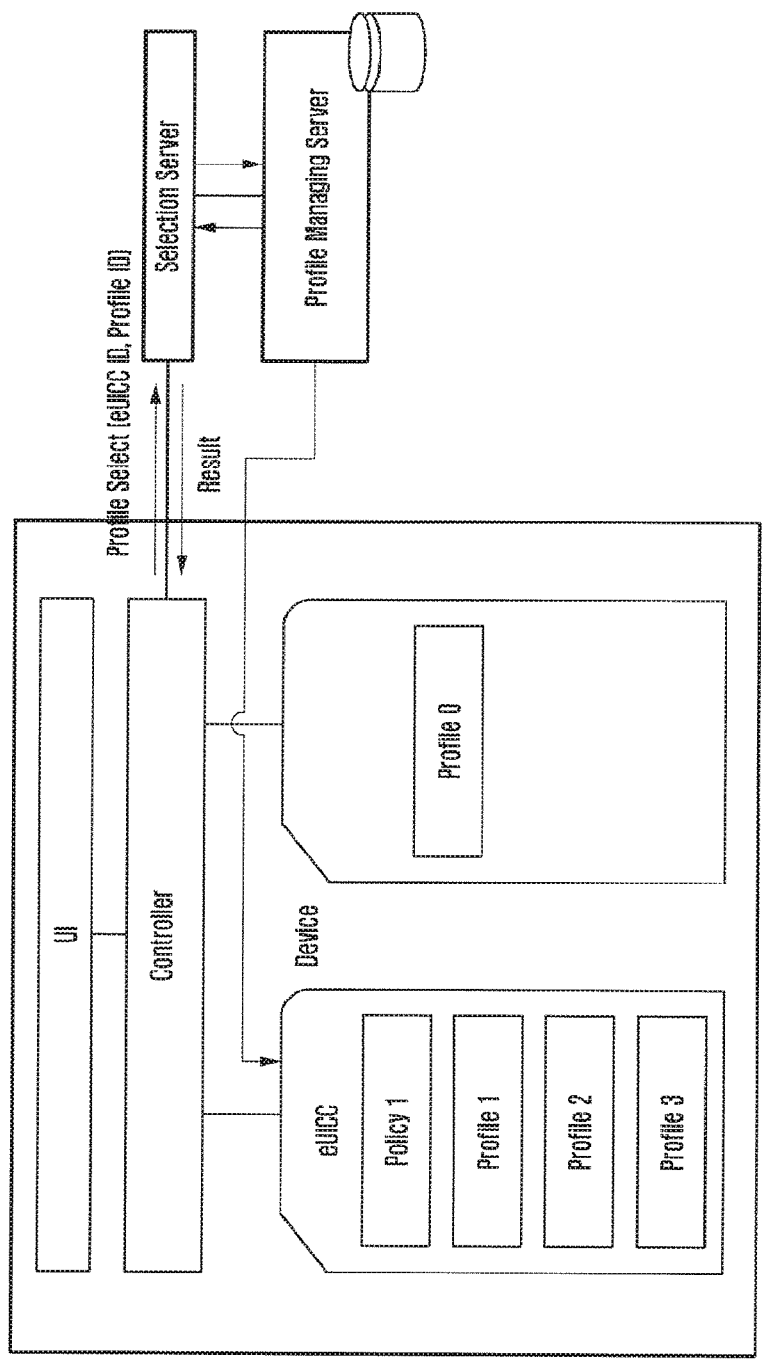
FIG. 12 is a diagram illustrating an example method for a controller to directly apply a profile using a selection server according to this disclosure.

As shown in FIG. 12, the terminal applies the profile through the server. The controller transmits, to a server (such as a selection server), a message for requesting for applying a profile containing information about the selected profile. The server applies the selected profile to eUICC through a profile managing server and transmits the response with the application result to the controller.

Referring back to FIG. 4, optionally, the terminal performs a re-boot procedure and re-connects to the network (417).

As described above, according to embodiments of the present invention, terminals equipped with both eUICC and UICC efficiently selects profiles stored in the eUICC and UICC in order to connect to a network.

Although embodiments of the invention have been described in detail above, it should be understood that many variations and modifications of the basic inventive concept herein described, which may be apparent to those skilled in the art, will still fall within the spirit and scope of the embodiments of the invention as defined in the appended claims.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of operating a terminal including a first universal integrated circuit card (UICC) and a second UICC, comprising:
   determining whether a profile changing related event is detected;
   displaying a profile list including at least one profile of the first UICC and at least one profile of the second UICC, in case that the profile changing related event is detected;
   identifying a profile from the profile list based on a received input; and
   applying the profile to the terminal using a UICC associated with the profile.

2. The method of claim 1, wherein the first UICC and the second UICC comprises:
   at least one of an embedded UICC (eUICC) and a detachable UICC.

3. The method of claim 1, wherein the profile changing related event includes at least one of:
   a user input, a change in mobile network operator (MNO), a change in public land mobile network identity (PLMN ID), a change in network state and a change in MNO's policy.

4. The method of claim 3, further comprising:
   setting a mode to detect the profile changing related event, wherein the mode comprises at least one of:
   a manual mode to detect the profile changing related event including the user input; and
   an automatic mode to detect the profile changing related event including at least one of the change in mobile network operator (MNO), the change in public land mobile network identity (PLMN ID), the change in network state and the change in MNO's policy.

5. The method of claim 1, further comprising:
   receiving the input for selecting the profile from the displayed profile list.

6. The method of claim 1, wherein the profile list displays information on the at least one profile of the first UICC and the at least one profile of the second UICC.

7. The method of claim 1, wherein applying the profile to the terminal comprises at least one of:
   transferring a profile applying request to the UICC in which the profile is stored and receiving a response with a profile application result from the UICC in which the profile is stored; and
   transmitting, to a server, a profile applying request for the UICC in which the profile is stored and receiving a response with a profile application result from the server.

8. An apparatus of a terminal, the apparatus comprising:
   a profile storing unit including a first universal integrated circuit card (UICC) and a second UICC; and
   a controller coupled with the profile storing unit and configured to:
   determine whether a profile changing related event is detected,
   display a profile list including at least one profile of the first UICC and at least one profile of the second UICC, in case that the profile changing related event is detected,
   identify a profile from the profile list based on a received input,
   and
   apply the profile to the terminal using a UICC associated with the profile.

9. The apparatus of claim 8, wherein the first UICC and the second UICC comprises:
   at least one of an embedded UICC (eUICC) and a detachable UICC.

10. The apparatus of claim 8, wherein the profile changing related event includes at least one of:
    a user input, a change in mobile network operator (MNO), a change in public land mobile network identity (PLMN ID), a change in network state, and a change in MNO's policy.

11. The apparatus of claim 10, wherein:
    the controller is configured to set a mode for detecting the profile changing related event; and
    wherein the mode comprises at least one of a manual mode for detecting the profile changing related event including the user input and an automatic mode for detecting the profile changing related event including at least one of the change in mobile network operator (MNO), the change in public land mobile network identity (PLMN ID), the change in network state and the change in MNO's policy.

12. The apparatus of claim 8, wherein the controller is further configured to control to receive the input for selecting the profile from the displayed profile list.

13. The apparatus of claim 8, wherein the profile list displays information on the at least one profile of the first UICC and the at least one profile of the second UICC.

14. The apparatus of claim 8, further comprising a transceiver coupled with the controller,
    wherein the controller is configured to transfer a profile applying request to the UICC in which the profile is stored and receive a response with a profile application result from the UICC in which the profile is stored, or wherein the controller is configured to control the transceiver to transmit, to a server, a profile applying request for the UICC in which the profile is stored and receive a response with a profile application result from the server.

\* \* \* \* \*